United States Patent
Steenberg et al.

(10) Patent No.: US 8,649,987 B2
(45) Date of Patent: Feb. 11, 2014

(54) SYSTEM AND METHOD TO MONITOR AND MANAGE PERFORMANCE OF APPLIANCES

(75) Inventors: Carsten M. Steenberg, Penobscot, ME (US); Nielsen Van Duijn, Blue Hill, ME (US)

(73) Assignee: Powerhouse Dynamics, Inc., Newton, MA (US)

( * ) Notice: Subject to any disclaimer, the term of this patent is extended or adjusted under 35 U.S.C. 154(b) by 546 days.

(21) Appl. No.: 12/989,492

(22) PCT Filed: May 7, 2009

(86) PCT No.: PCT/US2009/043104
§ 371 (c)(1),
(2), (4) Date: Oct. 25, 2010

(87) PCT Pub. No.: WO2009/137654
PCT Pub. Date: Nov. 12, 2009

(65) Prior Publication Data
US 2011/0040785 A1 Feb. 17, 2011

Related U.S. Application Data

(60) Provisional application No. 61/051,026, filed on May 7, 2008.

(51) Int. Cl.
*G01R 21/00* (2006.01)
*G06F 7/00* (2006.01)
(52) U.S. Cl.
USPC .......................................... 702/61; 707/769
(58) Field of Classification Search
USPC ............... 702/61, 57, 60, 62, 81, 84, 182, 702/187–188; 700/9, 17, 22, 27, 108–110; 705/7.11, 7.38, 7.41, 300; 707/705–708, 726, 736, 755, 758, 707/769–770, 781; 709/217–220; 715/700, 715/716, 733–736, 744–745, 747–748
See application file for complete search history.

(56) References Cited

U.S. PATENT DOCUMENTS

| | | |
|---|---|---|
| 5,880,677 A | 3/1999 | Lestician |
| 6,552,525 B2 | 4/2003 | Bessler |
| 6,983,210 B2 | 1/2006 | Matsubayashi et al. |

(Continued)

OTHER PUBLICATIONS

Inoue et al., Network Architecture for Home Energy Management System, Aug. 2003, IEEE Transactions on Consumer Electronics, vol. 49, No. 3, pp. 606-613.*

(Continued)

*Primary Examiner* — Toan Le
(74) *Attorney, Agent, or Firm* — Dennis R. Haszko

(57) ABSTRACT

A system and method providing home and small business owners to monitor and manage one or more appliances. This enables a use to understand in detail their electrical consumption, to make informed decisions based on factual data about energy-saving upgrades to their current systems/appliances, and to provide Internet-based surveillance and control of systems for prevention of freezing, breakdown, or possible fire-related losses, including possible loss-of-life. The system and method includes through the use of Internet based computer software and databases, a hardware interface with electrical circuit panel(s) or fuse boxes in communication with the software and databases and optional wireless outlet monitoring units in communication with the software and databases. The databases being formed and created by the system and method for determining performance of appliances.

24 Claims, 6 Drawing Sheets

(56) References Cited

U.S. PATENT DOCUMENTS

| | | | |
|---|---|---|---|
| 6,993,417 | B2 | 1/2006 | Osann, Jr. |
| 7,161,483 | B2 | 1/2007 | Chung |
| 7,276,915 | B1 | 10/2007 | Euler et al. |
| 7,317,404 | B2 | 1/2008 | Cumeralto et al. |
| 7,346,433 | B2 | 3/2008 | Budike, Jr. |
| 7,379,997 | B2 | 5/2008 | Ehlers et al. |
| 7,423,546 | B1 | 9/2008 | Aisa |
| 7,451,017 | B2 | 11/2008 | McNally |
| 7,460,930 | B1 | 12/2008 | Howell et al. |
| 7,463,986 | B2 | 12/2008 | Hayes |
| 2006/0184288 | A1 | 8/2006 | Rodgers |
| 2006/0200542 | A1 | 9/2006 | Willig |
| 2006/0271314 | A1* | 11/2006 | Hayes .......................... 702/62 |
| 2008/0077355 | A1 | 3/2008 | Casler et al. |
| 2008/0215263 | A1 | 9/2008 | Flohr |
| 2008/0306985 | A1 | 12/2008 | Murray et al. |

OTHER PUBLICATIONS

Ravich et al., "Ambient Energy Monitor", APD Product Reports, The Antilium Project, University of Michigan, dated Dec. 12, 2004, 59 pages.

Kim et al., "The EnTrak System: Supporting Energy Action Planning via the Internet", Proc. CTBUH (Congress of Tall Buildings Urban Habitats), Seoul, Korea, Oct. 2004, 8 pages.

PCT ISA, Written Opinion of the International Search Authority for PCT/US09/43104, ISA/US, dated Jun. 22, 2009, 5 pages.

UFO Power Center, http://www.energyufo.com/, downloaded Jun. 23, 2011, 5 pages.

Wattson: The Clock That Will Rock Your World, http://www.diykyoto.com/uk, downloaded Jun. 23, 2011, 4 pages.

Threshold online products brochure, http://www.thresholdsmarthome.com/index.php?option=com_content&view=category&layout=blog&id=14&Itemid=20, downloaded Jun. 23, 2011, 8 pages.

Tendril Volt—3-prong Zigbee Enabled Electrical Outlet, http://www.tendrilinc.com/product/volt/, downloaded Jun. 23, 2011, 2 pages.

Sequentric Smart Grid Technologies online product brochure, http://www.sequentric.com/products/index.html, downloaded Jun. 23, 2011, 1 page.

POWER2SAVE online sell sheet, http://powertosave.ca/wp-content/uploads/2011/05/EFERGY_SellSheet.pdf, downloaded Jun. 23, 2011, 1 page.

Kill A Watt Wireless, P3 International online brochure, http://www.p3international.com/products/consumer/p4200.html, copyrighted 2010, downloaded Jun. 23, 2011, 1 page.

Onzo online brochure, http://onzo.com/solutions/, downloaded Jun. 23, 2011, 2 pages.

Micasaverde Vera online brochure, http://www.micasaverde.com/vera.php, downloaded Jun. 23, 2011, 2 pages.

LucidDesignGroup online brochure, Building Dashboard Network, http://www.luciddesigngroup.com/network/techspecs.php, downloaded Jun. 23, 2011, 2 pages.

Geo: Green Energy Options, Domestic Connected Home, http://www.greenenergyoptions.co.uk/our-products/energy-monitors1/domestic-connected-home, downloaded Jun. 23, 2011, 1 page.

Fat Spaniel Technologies online borchure, http://www.fatspaniel.com/media/swfs/hiw_Solar_Elec.swf, downloaded Jun. 23, 2011, 1 page.

Energy Hub online brochure, http://www.energyhub.com/our-products/home-base/, downloaded Jun. 23, 2011, copyrighted 2009-2011, 1 page.

Electrotek Concepts, Inc. online brochure, http://www.energymonitoring.com/, copyrighted 2000-2011, downloaded Jun. 23, 2011, 2 pages.

TED: The Energy Detective, How Ted Works, http://www.theenergydetective.com/about/howtedworks, copyrighted 2010, downloaded Jun. 23, 2011, 2 pages.

Efergy, elite wireless electricity monitor instructions brochure, http://akiai6473yggqtvgbiaq.efergyfiles.s3.amazonaws.com/web-public/pdf/elite_Manual.pdf, downloaded Jun. 23, 2011, 10 pages.

CES: Computerized Electricity Systems, C.E.S. Smart Distribution Panel (CSDP), http://www.c-e-systems.com/index.php/ces-system/ces-smart-distribution-panel.html, copyrighted 2007, downloaded Jun. 23, 2011, 2 pages.

Brultech Research Inc., online borchure, ECM-1240 Home Energy Monitor, copyrighted 2011, downloaded Jun. 23, 2011, 3 pages.

Blue Line Innovations, PowerCost Monitor online brochure, http://www.bluelineinnovations.com/Products/PowerCost-Monitor/, copyrighted 2010, downloaded Jun. 23, 2011, 2 pages.

Black and Decker Energy Saver Series online brochure, http://www.blackanddecker.com/Energy/PowerMonitor.aspx?WT.mc_id=BDPowerMonitor, downloaded Jun. 23, 2011, 1 page.

Aztech Associates Inc., online product brochure, In-Home Display, http://www.aztechinc.com/en/products/?pid=90&sid=9114f0cd1efd9e291f68bbcdffb8e3dd, copyrighted 1996-2009, downloaded Jun. 23, 2011, 1 page.

Agilewaves online brochure, The Agilewaves Building Optimization System, http://www.agilewaves.com/products/system-overview/, copyrighted 2008, downloaded Jun. 23, 2011, 3 pages.

Advanced Telemetry online brochure, EcoView Residential, http://www.advancedtelemetry.com/residential.html, copyrighted 2010, downloaded Jun. 23, 2011, 1 page.

4HOME, online brochure, Home Monitoring Highlights, http://www.4home.com/services, copyrighted 2010, downloaded Jun. 23, 2011, 3 pages.

\* cited by examiner

SYSTEM AND METHOD TO MONITOR AND MANAGE PERFORMANCE OF APPLIANCES

CROSS REFERENCE TO RELATED APPLICATIONS

This application claims the benefit of priority of U.S. Provisional Patent Application No. 61/051,026 filed 7 May 2008, which is incorporated herein by reference.

FIELD OF THE INVENTION

The present invention relates generally to the field of environmental systems and total home energy management systems for building operations. More particularly, the present invention relates to monitoring energy consumption in structures such as residential housing or small office buildings to allow for dynamic adjustment of energy consumption patterns for managing and reducing energy consumption.

BACKGROUND OF THE INVENTION

The current state of the art for residential or small office building energy consumption monitoring consists primarily of the standard electric meter, either electromechanical induction watt-hour meters or electronic meters using solid state technology. These meters are ubiquitous and provide gross data on electrical usage, generally in the form of total usage, in kilowatt hours, for a specific period of time, usually by the month, for the building as a whole. Thus, while a home owner, for example, knows on a monthly basis from the electric meter reading the total electricity usage for all electrical devices in the home, there is no way to break this usage down into smaller defined periods of time or for individual electrical devices.

A new generation of electrical meters, known as "smart meters", can provide real-time or near real-time readings for electricity usage, as well as provide notification of power outages and power quality monitoring. However, the information obtained through smart meters continues to be limited to total electricity usage for all electrical devices in the building. Also, while smart meters may remotely communicate with a central server, such as a utility company, the information is not available to the consumer on a real-time basis. Accordingly, some electrical monitoring improvements exist that purport to monitor specific electrical devices. Such include U.S. Pat. No. 7,423,546 issued to Aisa on 09 SEP 2008 for a device, system and method for monitoring a household electric appliance and U.S. Pat. No. 6,983,210 issued to Matsubayashi et al. on 3 Jan. 2006 for an energy management system, energy management method, and unit for providing information on energy-saving recommended equipment.

The Aisa device is described for monitoring a household electric user, in particular a household appliance, presenting an electric load, where the monitoring device is connected between a source of electric energy and the electric load. The monitoring device includes measuring means for detecting the quantity of electric power or current absorbed by the user. The monitoring device includes control means programmed for: comparing the absorption of electric power or current measured through the measuring means with reference values of electric power or current, which are stored within the control means; generating, in function of the comparison, information which is representative of the present status or phase of operation of the electric user; and allowing the information to be read from outside the device.

The Matsubayashi et al. device is an energy management system capable of calculating power consumption based on equipment information on electrical equipment which is used by a resident. Power consumption is also estimated when a replacement is made with energy-saving equipment. The device then compares and displays the calculated and estimated power consumptions of the electrical equipment owned by the resident, and thereby, allow the resident to become aware of how the replacement helps save energy.

It is therefore an objective of the present invention to provide a system for monitoring energy consumption in residential and small office buildings which provides real-time data of electricity usage of individual electrical devices.

It is a further objective of the present invention to provide a system for monitoring energy consumption in residential and small office buildings which provides an analysis of the electricity usage of individual electrical devices in comparison with alternative devices to assist the user in decision-making regarding replacement, substitution, addition, or elimination of electrical devices.

It is yet a further objective of the present invention to provide a system for monitoring energy consumption in residential and small office buildings which provides remote surveillance over the Internet of electrical systems for the detection of interruptions of use.

Other objectives of the present invention will be readily apparent from the description that follows.

SUMMARY OF THE INVENTION

It is an objective of the present invention to obviate or mitigate at least one disadvantage of previous energy management systems and related methods.

The present invention effectively communicates the detailed usage of electrical energy within the home or small business office building. Data is provided in real-time, as a function of kilowatt-hour usage and of cost. The data is gathered for individual appliances/electrical devices and compared against a database of comparable appliances/electrical devices for recommendations to reduce energy consumption. By providing the consumer with such data, the consumer learns which appliances/electrical devices use how much energy, and it becomes very simple to address changes in the home or office that can lead to more efficient energy use and lower costs.

Data is gathered by a hardware interface near to the circuit panel(s) or fuse box(es), whereby individual circuits are independently monitored. Thus, major appliances, such as stoves, refrigerators, washing machines, furnaces, and the like, which are typically wired on their own dedicated circuits, can be individually monitored. For circuits in which there exist multiple outlets, individual outlet monitors are used to monitor the electrical usage thereof. Outlet monitors may be hard-wired to appliances like hot water heaters and central air conditioners, or similar appliances that are not on an individual circuit or need to be able to be turned on/off remotely. The outlet monitor may also be a replacement for a common wall switch. The data is then communicated to a server containing the system software, either by wired connection or by wireless technology, which analyzes the usage against pre-loaded data resident in one or more databases. The databases contain information from manufacturers on alternate appliances/electrical devices for comparison with actual usage. Other contributors of consumer product information also can be linked into these databases to provide the consumer with a wide scope of reliable information when making a product choice. These comparisons can be used to make recommendations and provide pay-back calculations vs. cost savings on replacement appliances/electrical devices. The data can also be analyzed against variable costing protocols, giving the consumer recommendations on the most efficient times of day for operating certain appliances/electrical devices.

While database information may be partially or in-whole located within an on-premises embodiment of the present invention, centrally locating the database on a central server is preferred. Partial database information could be downloaded from the central server as necessary. As the data is also available over the Internet, the consumer is able to monitor the energy consumption remotely. Because an abrupt cessation of power usage often indicates a problem, the system can be configured to automatically alert the consumer to the existence of safety concerns, such as the loss of heat from a malfunctioning furnace. A consumer with remote Internet monitoring capabilities will therefore always be able apprised of potential disasters.

In a first aspect, the present invention provides a system to monitor and manage appliance performance, the system including: a server arranged in communication with one or more appliances located within a structure; the server configured to continuously obtain operational data from the appliances; a central database located remote from the server and arranged in communication with the server to receive and process the operational data; and wherein the server alerts a system user upon variation of the operational data from predetermined operating thresholds.

In a further embodiment, there is provided a method to monitor and manage appliance performance, the method including: monitoring operational data of one or more appliances located within a structure at an interval of once per second; accumulating the operational data over an interval of one minute; communicating the accumulated operational data to a central database; comparing the operational data with at least one reference database until a variance above a predetermined threshold is detected; upon detection of the variance exceeding the predetermined threshold, providing a system alert.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides a system and method for monitoring and managing performance of electric appliances in a home or small business setting. Moreover, the present invention allows home and small business owners to understand in detail their electrical consumption and to make informed decisions based on factual data about energy-saving upgrades to their current appliances/electrical devices. The present invention also provides Internet-based surveillance of building systems for prevention of freezing, breakdown, or possible fire-related losses, including possible loss-of-life.

Figure 1:
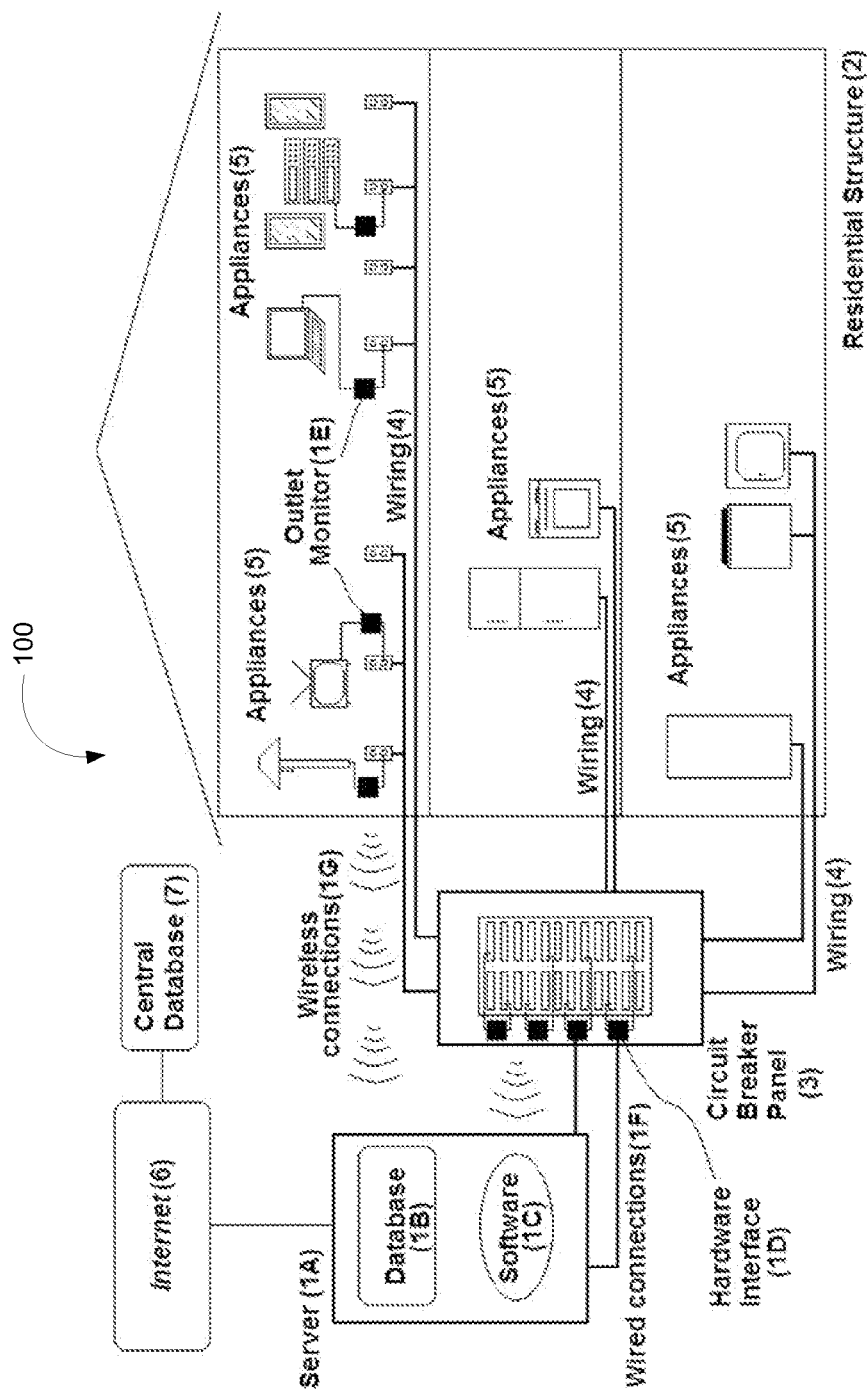
FIG. 1 is a schematic drawing depicting the relationship of the major components of the system of the present invention in relationship to each other and to appliances/electrical devices and the Internet.

As shown generally in FIG. 1, the present invention is an electronic/software/Internet based monitoring system 100 that is installed easily into electrical circuit breaker panel(s) 3 of new and existing homes and commercial structures (illustrated by example for clarity as a residential structure 2) that allows a consumer to understand their immediate and long term electrical consumption on a fully detailed level. The present invention provides the consumer with a wide range of money and energy saving services, including advanced home security features, custom tailored to their unique electrical and appliance environment.

With further regard to FIG. 1, it is shown that the system 100 includes a server 1A. Although the term "server" is used, it should be understood that the server 1A functions as a gateway that is a data collection and transmission device and may be embodied as a base unit as per the later detailed description hereinbelow. Such terms may therefore be interchangeable without straying from the intended scope of the present invention. The server 1A is located on the premises of the consumer. The server 1A incorporates specialized computer software 1C which controls the system 100 and related method in cooperation with one or more databases 1B. For clarity of illustration, only a single database 1B is shown in FIG. 1 though it should be understood that such database 1B will correspond to databases 300, 400, and 500 as later shown and described below with further reference to FIG. 2. In FIG. 1, the system 100 also includes a hardware interface 1D between the server 1B and the circuit breaker panel(s) 3. The hardware interface 1D provides detailed individual circuit electrical data collection with the ability to monitor up to 30 or more circuits within the structure's 2 circuit breaker panel(s) 3.

As shown in FIG. 1, the hardware interface 1D may communicate with the server 1B via a wired connection 1F or via a wireless connection 1G. In implementing the present invention, it may be preferable that the hardware interface 1D is integrated as part of the server 1B. Outlet monitors 1E can communicate to the server 1B wirelessly or over power line. As further described below, the server 1B can connect to a home router by wired or wireless access. It should be readily apparent to one skilled in the art of wireless communications that any suitable wireless network protocol may be utilized including, but not limited to, a wireless protocol such as ZigBee® technology which a trademark of the ZigBee Alliance Corporation of San Ramon, Calif. Large appliances 5 such as stoves, refrigerators, washing machines, and the like, are often on a dedicated circuit with dedicated wiring 4. Accordingly, the hardware interface 1D may monitor these appliances 5 from the circuit breaker panel 3. Individual energy consumption is thus readily measured for these appliances 5.

In addition to the hardware interface 1D, the system 100 also includes outlet monitors 1E that are plugged into individual outlets throughout the structure 2 as a manner of monitoring additional appliances 5, such as air-conditioners, space heaters, etc., that normally plug directly into a standard outlet. Each outlet monitor 1E may be physically plugged into a standard outlet whereby the given appliance 5 is then plugged into the outlet monitor 1E. These outlet monitors 1E are effective in giving further detailed power use on appliances 5 that are located on multiple outlet feeds from the circuit breaker panel 3 and which are not on a dedicated circuit. Outlet monitors 1E each include internal software and control circuitry which is designed to gather and/or process and/or store power consumption usage information. The data is accessible by the server 1A via powerline networking (e.g., HomePlug® technology where HomePlug® is a trademarked appliance networking interface of HomePlug Powerline Alliance, Inc. of San Ramon, Calif., USA), TCP/IP Ethernet, ZigBee® wireless, or similar type of, data connection known in the communications art.

Though not shown with specific detail, it should be understood and readily apparent to one in the electronics art that the system 100 in accordance with the present invention includes status LEDs and/or an appropriate graphical user interface (GUI) and has all necessary ports for enabling the connections between the server 1A and the hardware interface 1D, outlet monitors 1E, and the Internet 6. More specifically, the hardware interface 1D may use known split core current sensors that clip onto the existing wires, or may be 'hard-wired' directly into the circuit breaker panel 3 as needed. As most structures include two 120 volt power lines going in their electrical panel, the present invention will typically include two corresponding clip-on sensors or hard-wired leads which will monitor the total power going into the structure 2. The remaining sensors are clipped onto, or hard-wired leads attached to, individual power supply wires going into the circuit breaker panel 3 representing each individual appliance 5 like clothes dryer, dishwasher, furnace, . . . etc., and/or certain outlet zones in the home. A plug-in type or hard-wired transformer unit powers the system 100, and may also have the function of monitoring the line voltage. The system 100 may record true RMS current, which may avoid the assumption of sine waveforms.

In addition to or in place of status LEDs and/or an appropriate GUI located on or near the server 1A, the system 100 can wirelessly communicate with an optional wall mounted (or counter-top) display which may be remotely placed in a central location anywhere within the structure 2. Such a wall mount display can show power-related system consumption cost in monetary terms (e.g., $), status, alarms, suggestions, or any other system-related information and may do so either simultaneously with webpage data or independently of an Internet connection. This optional wall mounted display may be based on the Ultra Mobile PC (UMPC) interface or other suitable small form factor touch screen interface or tablet PC platform, although a full-function computer may also be used. The optional wall mounted display can provide most of the web functionality for structures 2 with a dial-up Internet service or no Internet service. Through the optional wall mounted display, a user can also compare current appliance performance to the data residing in the system databases 1B as discussed further below with regard to FIG. 2. This data residing in the system databases 1B may be stored in encrypted form for security reasons as the stored data may be proprietary and/or personal (i.e., historical and user-specific) in nature.

It should be further understood that the server 1A in accordance with the present invention may be in the form of a modem-like base unit where software 1C within such base unit may include a built-in embedded web server. The embedded web server can allow the unit to be easily configured/setup using a standard web browser from an offline or online PC connected to the system 100 via such base unit by way of a known wireless or Ethernet router/hub connections. It should be understood that the majority of setup/configuration options can also be accessed from any webpage worldwide when the server 1A is online and connected to the Internet 6 as shown in FIG. 1. The web server will also provide the system user (e.g., homeowner) with usage information and therefore can function as an interactive GUI.

When the server 1A is online and connected to the Internet 6, the invention (e.g., via the embedded web server) can transmit power consumption data via the Internet 6 to a central database 7. The central database 7 may be in the form of a relational database such as, but not limited to, a structured query language (SQL) database. Data may be transmitted several times every minute (with faster or slower intervals possible). Preferably, a real-time effect would be obtained by monitoring individual appliance power consumption and run time every second with an update of such current data to the central database at least once per minute. The software 1C can also be configured to store data locally on the server 1A if the Internet service goes down or connectivity is otherwise detrimentally affected. It should be readily apparent to one in the data storage art that such local data storage may be accomplished via any known manner such as, but not limited to flash memory (not shown).

In operation, the central database 7 functions to constantly sort, organize, and provide feedback on the detailed consumption/run time data transmitted from the server 1A. As mentioned above, the database 1B may include one or more databases. With regard to FIG. 2, it is shown that these one or more databases can include a historically-compiled database 300, a proprietary database 400, and a recommendation database 500. Each of the historically-compiled database 300 and the proprietary database 400 function as a reference database against which the current operational data can be compared. The historically-compiled database will include data from among the appliances 5 within the structure 2 as well as actual data from the central database for similar appliances in other structures utilizing the present inventive system.

The proprietary database may include information provided by appliance manufacturers, Energy-Star® services in US & Canada (Energy Star® is a rating service for promoting energy efficiency and energy efficient products and is a trademark of the Environmental Protection Agency, a Federal Agency of the United States, Washington D.C.), and also independent data/product/information companies like Consumer Reports® (Consumer Reports® is a periodical dealing with testing and evaluation of consumer products and services and is a trademark of Consumers Union of United States, Inc., Yonkers, N.Y.). The recommendation database may be a unique set of instructions derived from multiple sources arranged to trigger a directive in the form of a suggestion or corrective action for a system user to take. The recommendation database may also include rebate programs and other incentives offered by state and local governments and utilities that might reduce the cost of energy efficient appliance or equipment replacements. The given directive issued by the recommendation database is dependent upon the analysis made by the software 1C.

Examples of scenarios which may trigger an alert include, but are not limited to: a) Suspected outage—utility may be alerted as well; b) Month to Date (MTD) usage above pre-set threshold; c) MTD usage/day significantly above previous month(s); d) High appliance use compared to 6 months average; e) Appliance use not within expected levels based on manufacturer ratings; f) Appliance use incurs unexpected usage; or g) Indoor temperature above (below) threshold.

In operation, current power consumption and run time values for each individual appliance 5 may be compared to the database 1B that may contain most popular appliances power consumption specifications in the proprietary database. As mentioned, the historically-compiled database within database 1B may also draw comparative information from its own network of subscribers' "real-life/non-lab" data via the central database 7. Directives from the recommendation database can incorporate other feedback to consumers (i.e., the system user) that may include appliance diagnostics and manufacturers' recommended remedial consumer actions for inefficient appliance performance. The GUI (remote display or otherwise as described below in regard to the alarm function) may clearly communicate the overall performance of the structure 2 in non-technical terms, and may be presented as an executive summary to consumers, who may easily access more detailed technical information as well.

The system 100 in accordance with the present invention also provides alarm/alert functionality. If any given appliance 5 is performing irregularly or using more power than the rated consumption as compared to the values stored in the database 1B, an alarm may be triggered. An alert to the consumer is generated whereby they are notified via a visual alarm on the monitoring web page, and/or by email, and/or by cell phone text message (e.g., short message service (SMS)), and/or by a recorded voice via standard telephone, and/or by other suitable notification means. Moreover, it should be understood that the alarm options are user configurable and thus fully customizable for any given user such as, but not limited to, a physically challenged individual such as a hearing impaired person. In addition to SMS, data related to appliance operation can also be simultaneously displayed on any personal digital assistant (PDA) device including any "smartphone" such as an iPhone® device (iPhone® is a wireless telecommunications device and a trademark of Apple Inc. of Cupertino, Calif., USA) or a BlackBerry® device (BlackBerry® is a wireless telecommunications device and a trademark of Research in Motion Limited, Waterloo, Ontario, Canada).

As mentioned above, all data logging may be accumulated, captured, and stored in the central database 7. By way of long-term accumulation of data, the system 100 can use the central database 7 and a related centralized host server (not shown) to analyze energy consumption information in increasingly meaningful ways to help deliver additional information, and/or innovative products and/or services used by the server 1A.

Figure 2:
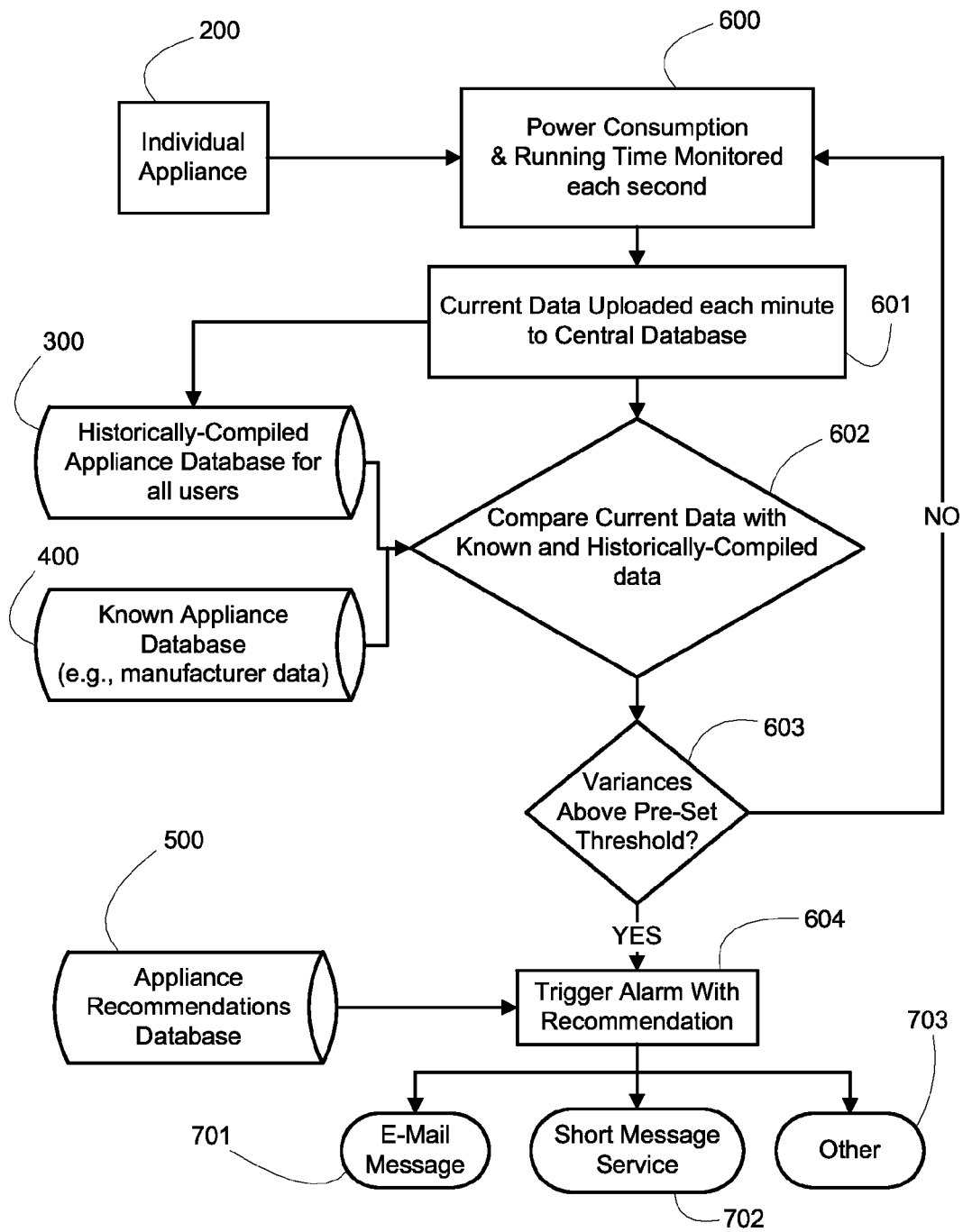
FIG. 2 is a flow diagram illustrating the method in accordance with the invention shown in FIG. 1.

With further regard to FIG. 2, the method in accordance with the present invention will be described in further detail. It should be understood that the method is executed in software and embodied in a tangible software medium as is known in the programming art. Such tangible software medium may include an application specific integrated circuit (ASIC) embedded in the server 1A as software 1C, remote software resident in a central host server, local software stored on a connected computing device (e.g., PC), or any similar and appropriate tangible embodiment.

At method step 600, information including power consumption and running time is obtained from each individual appliance 200 at one second intervals. The monitoring occurs for the duration of a minute and the data accumulated is then uploaded to the central database at method step 601. As previously described, the central database is in communication with the database 1B which includes the historically-compiled appliance database 300 for all users. Accordingly, the current data uploaded to the central database after being centrally analyzed by the central host server will continuously update the historically-compiled appliance database 300 located within the server 1A. At method step 602, the current data is compared with both the known appliance data (stored in the known appliance database 400) and the historically-compiled data (stored in the historically-compiled database 300) for the given type (i.e., brand/model) of the individual appliance 200. The outcome of this comparison step 602 will be some quantifiable variation which is the computed difference among the current, known, and historical values.

The quantifiable variation will then be analyzed at step 603 to determine whether such variance exceeds a pre-set threshold. The threshold will be determined as appropriate for the given type of data and is intended to be customizable at the product level rather than the user level. If the pre-set threshold is not exceeded, monitoring continues as shown by a return to method step 600. However, if the pre-set threshold is exceeded, then an alarm is triggered with an accompanying recommendation at method step 604. The recommendation is retrieved accordingly from the appliance recommendations database 500. It should be understood that the given recommendation is chosen from a unique set of instructions corresponding to the given type (i.e., brand/model) of the individual appliance 200. The given recommendation is a directive in the form of a suggestion or corrective action for the system user to take. The directive is provided to the system user by way of an e-mail message 701, an SMS text message 702, or any other manner 703 suitable to convey the directive to the system user.

It should be noted that the present invention embodied by the system and method described herein may further connect to residential/commercial weather monitoring equipment systems to integrate information from the outdoor environment into its capabilities and services. Advantages of this integration may include, for example, the comparing of outdoor temperatures, barometric readings, humidity, and other weather conditions to the structure's heating, ventilation, and air conditioning (HVAC) systems. Additional alarm/alert features may include consumer notification of significant discrepancies in interior-exterior temperature readings, and/or the failure of HVAC systems ability to respond appropriately. Immediate local weather conditions can also be remotely observed by the consumer. Weather information, as with all information collected by the system 100, may be data-logged into a permanent record of the structure 2, and may be continuously analyzed over time to explore other cost-saving measures that can be implemented by the consumer. This data may also be useful in the development of other home products.

Figure 3:
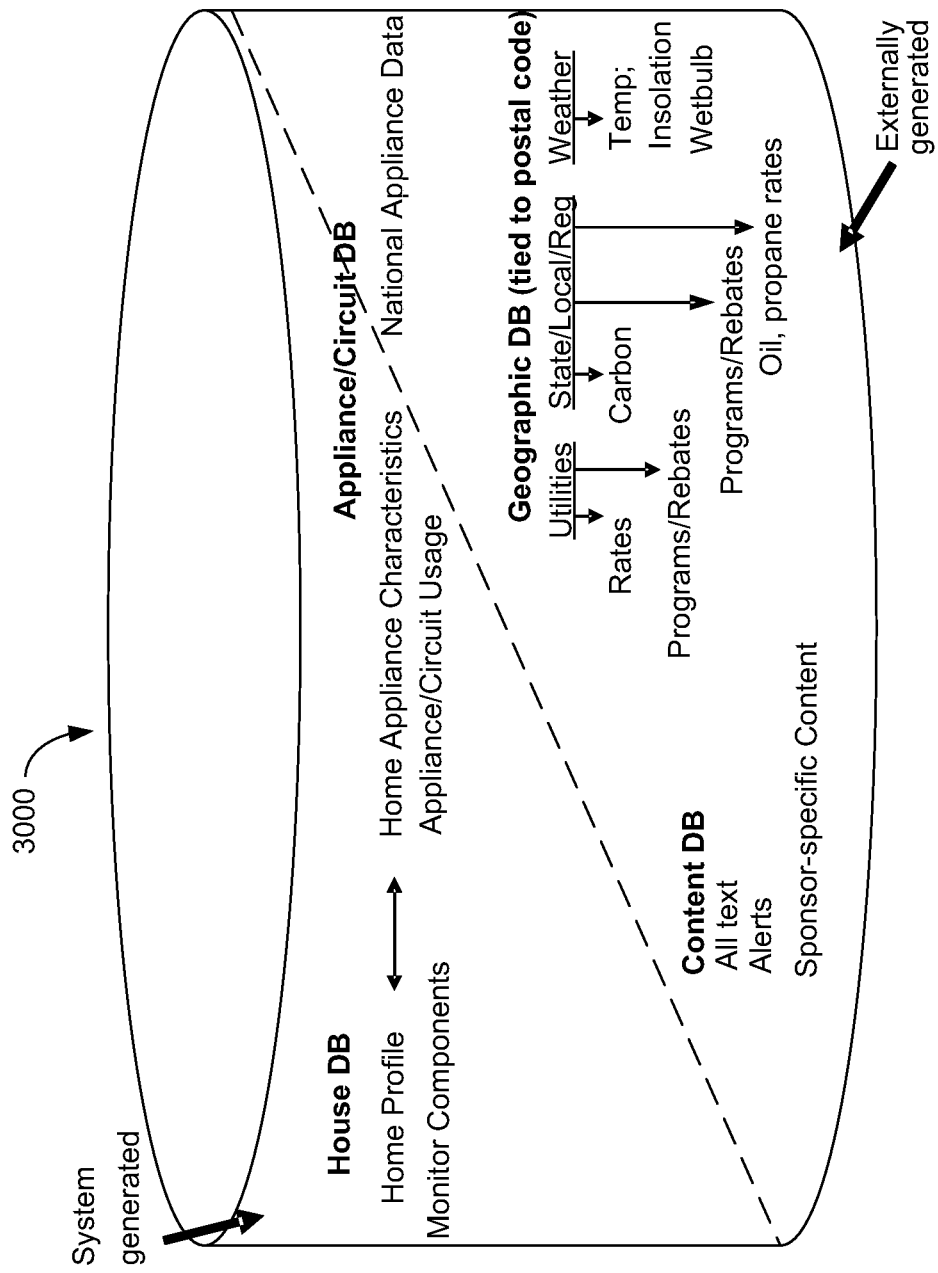
FIG. 3 is a schematic of a central database including a diversity of information form system generated and externally generated sources.

FIG. 3 shows a schematic of a central database 3000 including a diversity of information from system generated and externally generated sources. As mentioned previously above, the databases 300, 400, 500 as shown in FIG. 2 may be formed in a single central database. Indeed, such configuration is a preferred embodiment of the present invention. In such embodiment, the central database 3000 will include information that is either system generated or externally generated which dichotomy is shown by a transverse dotted line. As shown, the central database may be formed by smaller databases (DB) that include a house DB, Appliance/Circuit DB, Geographic DB, and Content DB. The house DB is a system generated pool of information that includes information unique to the system user such as, but not limited to, a home profile and the particular monitor components. The house DB interfaces with the Appliance/Circuit DB to the extent that characteristics of the home appliances and usage information for the given appliances and circuits monitored is obtained and stored. These aspects of the Appliance/Circuit DB are therefore system generated. However, the Appliance/Circuit DB may also include externally generated information such as national appliance data (e.g., from Consumer Reports® or directly from various manufacturers).

The externally generated information within the central database 300 also includes a geographic DB. The geographic DB may be organized in a suitable manner such as by postal code so as to group structures into the same or similarly situated physical areas. In such groups, it should be understood that similar characteristics such as weather, regulations (state and local), and utilities will be common. The geographic DB is therefore a useful basis for comparison and analysis of energy rates and related rebate programs such as, but not limited to, renewable energy (e.g., carbon or greenhouse gas) credits. The externally generated information may also include a content DB which includes all the recommendations (i.e., alerts and related text) which is the outcome of the method described above in regard to FIG. 2. The content DB may also include sponsor-specific content that may be, for example, related to a given manufacturer's current cost savings to a system user for trading in their poorly performing appliance. The central database 3000 would be housed in a central host shown below and described further as server array 4004 in FIG. 4.

Figure 4:
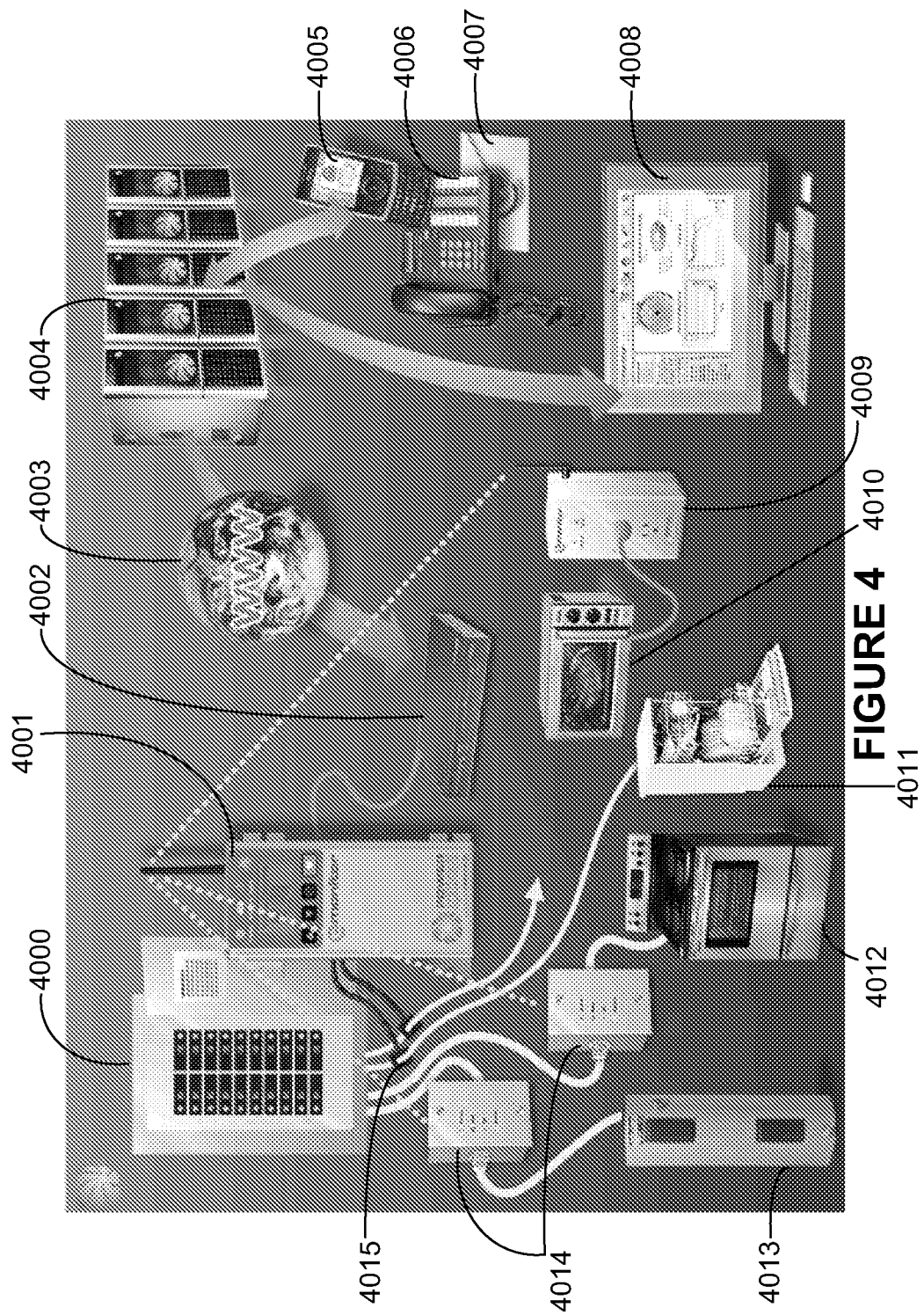
FIG. 4 is an illustration similar to FIG. 1 and showing further system elements in accordance with the present invention.

FIG. 4 is an illustration similar to FIG. 1 and showing further system elements in accordance with the present invention. This illustration includes a base unit 4001 connected to a communications interface shown in the form an Internet modem device 4002 linked via the Internet 4003 to a central server 4004 that includes a server array. The base unit can be hard wired to the modem device 4001 as shown or may be wirelessly connected thereto. The base unit 4001 communicates with appliance monitors which may be in the form of an outlet monitor 4009 to monitor a relatively small appliance such as a microwave 4010 or a hard wired monitor 4014 to monitor larger appliances such as a hot water heater 4013 or range 4012. Likewise, the base unit 4001 may be also connected via clamps 4015 (a non-invasive technique described above) to power supply lines of appliances directly connected to the circuit breaker 4000 including dish washer 4011.

The method as described with reference to FIG. 2 equally applies to the illustrative embodiment in FIG. 4. Specifically, the central server 4004 will issue specific alerts with recommendations to a given system user interface including, but not limited to, a handheld communications device (i.e. iPhone® or Blackberry®) 4005, a standard phone 4006, via email 4007, or to a PC terminal 4008 located either within the structure or remote from the structure via the Internet. While appliance monitoring is a primary function of the base unit 4001, it should be understood that the user interface is a two-way communications mechanism such that a system user may communicate remotely with the base unit via the central server 4004 over the Internet. Still further, the base unit 4001 working in conjunction with the given outlet monitor 4009, 4014 may also control the respective appliance. In this manner, a malfunctioning appliance or circuit under monitoring may be turned off or on remotely in response to a recommendation. Moreover, software at the central server may provide automated directives such that, for example, one or more appliances or circuits may be turned off during times of peak load (i.e., peak load demand control).

Figure 5:
FIG. 5 is an illustration of four types of monitor elements in accordance with the present invention.

It should further be understood that the outlet monitor of the present invention may take several forms without straying from the intended scope of the present invention. FIG. 5 illustrates four such variations of monitor elements in accordance with the present invention including outlet monitors 4009 and 4014 described above. Additionally, monitors may include a thermostatic monitor with remote controlled capabilities 5001 which functions like any heating or cooling thermostat, but with the additional capabilities of interfacing with the base unit 4001. Likewise, monitors may include a wall switch monitor 5000 which functions similar to any wall switch to control a given circuit and/or singular appliance, but again with the additional capabilities of interfacing with the base unit 4001.

Figure 6:
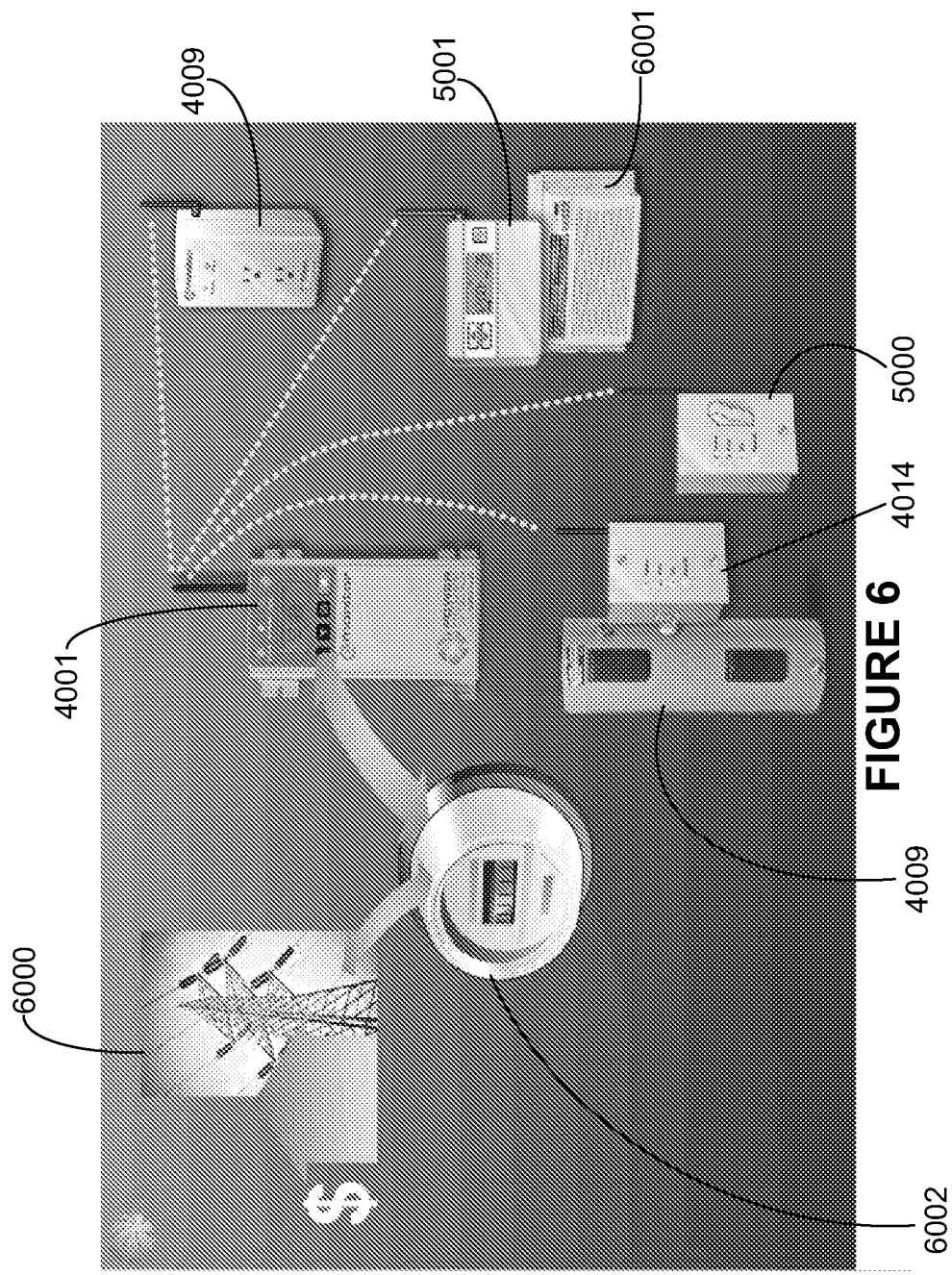
FIG. 6 is an illustration similar to FIGS. 1 and 4 showing the present invention within a smart grid embodiment.

FIG. 6 is an illustration similar to FIGS. 1 and 4 showing a generalized configuration of the present invention within a smart grid embodiment. Generally speaking, a smart grid environment is one in which the utility 6000 plays an active role in managing the electrical power supply via an interactive power (i.e., "smart") meter 6002. In such an environment, the utility 6000 may issue commands to its smart meter 6002 during peak usage to reduce power supplied (i.e., "demand response"). The base unit 4001 in such an environment would communicate directly with the smart meter 6002 via a standardized wireless protocol. Alternatively, the base unit 4001 could receive such commands from the utility 6000 over the Internet. The base unit 4001 would be in communication with each outlet monitor 4009, 4014, switch monitor 5000, and thermostatic monitor 5001 to effectively monitor and likewise control the given appliance 6001, 4009 or circuit. This demand response configuration of the present invention is very useful in peak pricing jurisdictions where utility rates may be 300% to 500% above standard rates during short periods of time.

Based on externally generated information from utilities, the present invention would be able to reduce the impact of such pricing on the system user. This may be accomplished via schedules set up by a system user or coordinated with smart grid technology via the utility company. In addition to smart grid applications, the present invention may also be applicable to photovoltaic (PV) applications. A PV implementation can include virtual 2-way metering, ensuring that the PV is running efficiently, and qualifying features for available credits & rebates. Further alternative features can include smart charging of plug-in electric vehicles during off-peak periods, integration with PV for net metering, and powering of appliances at night and back-up times.

In accordance with a varied number of implementations, there can be an equally varied number of alerts/recommendations. Various such efficiency recommendations are listed in TABLE 1 below.

TABLE 1

| Appliance | Assessment | Actions |
|---|---|---|
| Refrigerator | Identify older model either from appliance detail or usage levels Ascertain if there is 2nd unit | Compare costs of new based on style, model. Offer coupon/rebate. Recommend use only as needed, showing savings |
| Water Heater | Focus on high usage or older unit | Show cost and savings of solar unit and on-demand unit. Link to solar retailers. |
| Heating & Central A/C | Focus on older units | Show cost and savings of new unit, reelecting rebates. Link to retailers. Show cost savings of thermostat setting changes, and promote Internet addressable thermostats. |
| Washer | Focus on older units | Show cost and savings of new unit, par- |

TABLE 1-continued

| Appliance | Assessment | Actions |
|---|---|---|
| | | ticularly H-Axis. Offer coupon/rebate. |
| Dryer | Focus on older units, particularly electric | Show cost and savings of new unit & switch from Electric to Gas. Offer coupon/rebate. |
| Lighting | Measure individual lighting use. Estimate total lighting cost | Show savings of alternatives. Link to retailer selling CFL and LED. Promote switch and control units. |
| Phantom Load | Measure and identify | Promote outlet units. Link to power strips retailer. |
| Pool | Measure heater & pump | Show cost and savings of solar heater. Link to retailers. Show savings from pump cycling, particularly with time-based rates. |
| PV | Ascertain presence of PV | Show costs and savings, reflecting rebates. Link to retailers, including those using PV to provide electricity. |

Accordingly, the present inventive system and method results in "real time" 24/7/365 monitoring of all electrical systems, automatically provides calculations performed for appliances, and communicates that information directly to the system user by any suitable manner which may include e-mail, cell-phone text messages, and even with a computerized voice directly over the phone. The present invention is a unique collector and transmitter of information within the home and can easily be expanded to include other types of monitoring systems within the home or business which, in turn, are automatically integrated into the inventive system and method to thereby become available on-line, worldwide to the property owner, and also via handheld devices, or by phone. As such, it is intended that any monitoring device including full security systems can be connected to the system 100.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system to monitor and manage individual appliance performance, said system comprising:
   a gateway forming a data collection and transmission device;
   said gateway linked to a circuit breaker panel and configured to continuously obtain individualized operational data corresponding to one or more individual appliances electrically connected to said circuit breaker panel;
   a central database including expected operating thresholds formed from individual appliance power consumption and run time data, said central database being Internet-based and thereby located remote from said gateway and arranged in communication with said gateway to receive and process said operational data; and
   wherein said central database alerts a system user upon variation of said individualized operational data from said expected operating thresholds.

2. The system as claimed in claim 1 where said central database includes one or more databases having stored information corresponding to a specific appliance type.

3. The system as claimed in claim 2 where said stored information of a first database of said one or more databases includes said operational data as uploaded from said gateway.

4. The system as claimed in claim 3 where said variation of said operational data from said expected operating thresholds is computed via software on said central database.

5. The system as claimed in claim 4 where said gateway and said central database are in communication with one another via an Internet connection.

6. The system as claimed in claim 5 where said software forms a mechanism for data processing and analysis and is embodied in a tangible medium remote from said gateway.

7. The system as claimed in claim 5 where said first database includes historically-compiled data filtered through a statistical analysis in said central database and said central database further includes a second database having commercially-available operational data for a range of appliances and a third database having recommendations data such that said software compares said operational data with both said historically-compiled data and said commercially-available operational data to provide a recommendation selected from said recommendations data in conjunction with said alerting of said system user.

8. The system as claimed in claim 7 where said alerting of said system user occurs via said Internet connection.

9. The system as claimed in claim 8 where said system further includes more than one said gateway corresponding to more than one said structure, each said gateway configured to continuously obtain operational data from said appliances and transfer said operational data to said central database such that said historically-compiled data includes information corresponding to a plurality of substantially identical appliances from within a variety of said structures.

10. The system as claimed in claim 8 where said alerting occurs by way of an email message.

11. The system as claimed in claim 8 where said alerting occurs by way of a short message service text message.

12. The system as claimed in claim 5 where said gateway includes embedded software to initiate all communications via said Internet connection.

13. A system to monitor and manage individual appliance performance, said system comprising:
   a gateway forming a data collection and transmission device;
   said gateway linked to a circuit breaker panel and configured to continuously in real-time obtain individualized operational data corresponding to one or more individual appliances electrically connected to said circuit breaker panel;
   a central database being Internet-based and thereby located remote from said gateway and arranged in communication with said gateway to receive and process said individualized operational data in real-time at least once per minute; and
   wherein said central database alerts a system user upon variation of said operational data from expected operating thresholds.

14. The system as claimed in claim 13 where said central database includes one or more databases having stored information corresponding to a specific appliance type.

15. The system as claimed in claim 14 where said stored information of a first database of said one or more databases includes said operational data as uploaded from said gateway.

16. The system as claimed in claim 15 where said variation of said operational data from said expected operating thresholds is computed via software on said central database.

17. The system as claimed in claim 16 where said gateway and said central database are in communication with one another via an Internet connection.

18. The system as claimed in claim 17 where said software forms a mechanism for data processing and analysis and is embodied in a tangible medium remote from said gateway.

19. The system as claimed in claim 17 where said first database includes historically-compiled data filtered through a statistical analysis in said central database and said central database further includes a second database having commercially-available operational data for a range of appliances and a third database having recommendations data such that said software compares said operational data with both said historically-compiled data and said commercially-available operational data to provide a recommendation selected from said recommendations data in conjunction with said alerting of said system user.

20. The system as claimed in claim 19 where said alerting of said system user occurs via said Internet connection.

21. The system as claimed in claim 20 where said system further includes more than one said gateway corresponding to more than one said structure, each said gateway configured to continuously obtain operational data from said appliances and transfer said operational data to said central database such that said historically-compiled data includes information corresponding to a plurality of substantially identical appliances from within a variety of said structures.

22. The system as claimed in claim 20 where said alerting occurs by way of an email message.

23. The system as claimed in claim 20 where said alerting occurs by way of a short message service text message.

24. The system as claimed in claim 17 where said gateway includes embedded software to initiate all communications via said Internet connection.

\* \* \* \* \*